(12) United States Patent
Doerr et al.

(10) Patent No.: US 6,220,007 B1
(45) Date of Patent: Apr. 24, 2001

(54) APPARATUS FOR PREVENTING INTERFERENCE OF INTERMESHING LUGS ON SEPARABLE ROLLERS

(75) Inventors: Paul A. Doerr; Philip J. Egging, both of Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 09/389,805

(22) Filed: Sep. 3, 1999

(51) Int. Cl.$^7$ ........................................... A01D 45/02
(52) U.S. Cl. ................................. 56/16.4 C; 56/14.1
(58) Field of Search ......................... 56/16.4 C, 11.5, 56/11.7, 14.1, 16.4 R, 14.6, DIG. 1

(56) References Cited

U.S. PATENT DOCUMENTS

| | | |
|---|---|---|
| 3,555,791 | * 1/1971 | McCarty et al. ............... 56/14.1 |
| 3,820,311 | * 6/1974 | Sawyer et al. ............... 56/14.4 |
| 4,472,927 | 9/1984 | Vogt . |
| 4,896,483 | 1/1990 | O'Halloran . |
| 4,910,947 | 3/1990 | Seymour . |
| 4,972,661 | 11/1990 | Roden . |
| 5,022,219 | 6/1991 | Knurr . |
| 5,056,302 | 10/1991 | Rosenbalm . |
| 5,357,737 | 10/1994 | Ermacora . |

FOREIGN PATENT DOCUMENTS

464374B1    5/1991   (EP) .

* cited by examiner

Primary Examiner—Robert E. Pezzuto
Assistant Examiner—Árpád Fáb Kovács
(74) Attorney, Agent, or Firm—Henderson & Sturm LLP

(57) ABSTRACT

Two mower-conditioner lugged rollers provided with a four-gear timing system that allows the rollers to separate while still maintaining the timing.

3 Claims, 5 Drawing Sheets

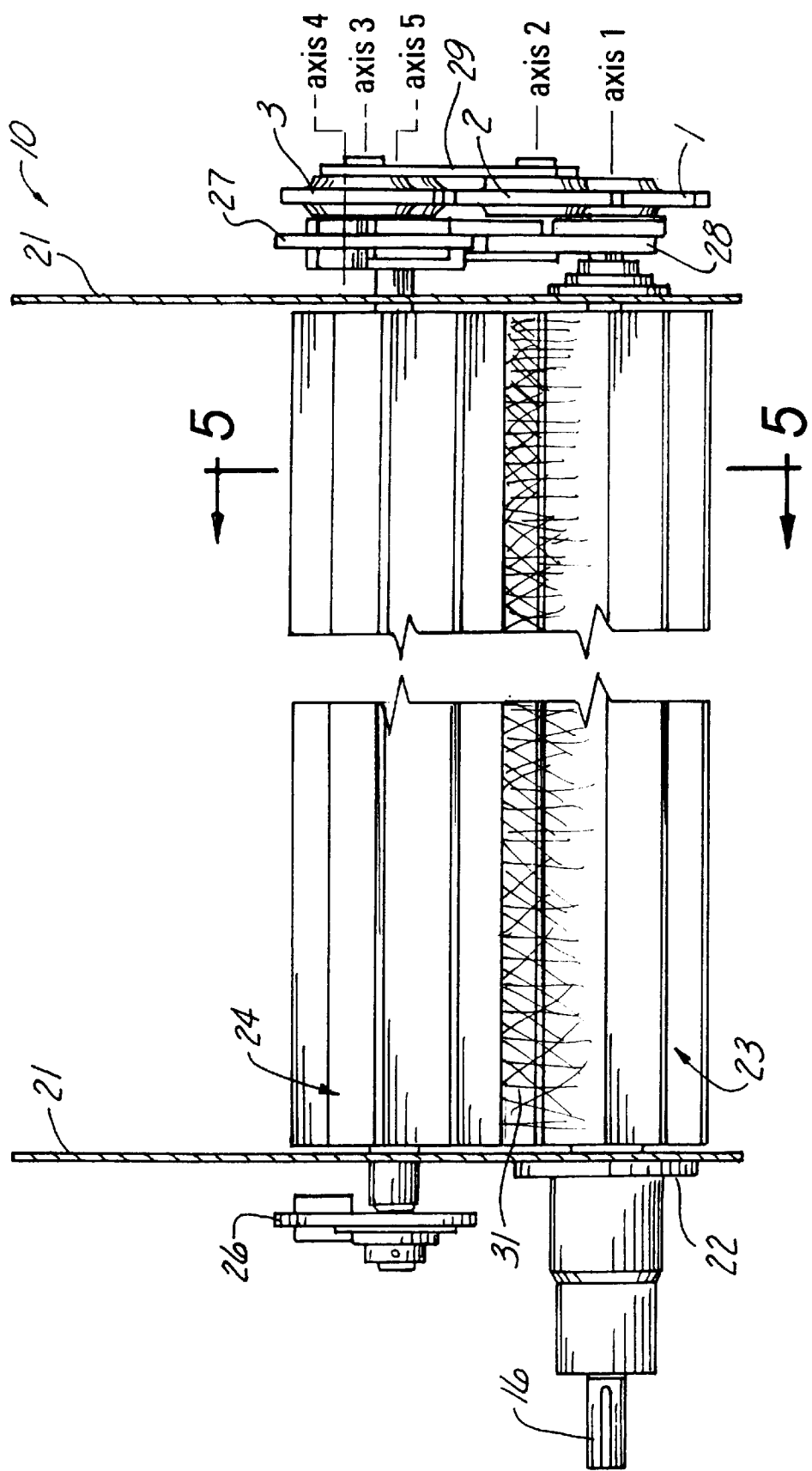

APPARATUS FOR PREVENTING INTERFERENCE OF INTERMESHING LUGS ON SEPARABLE ROLLERS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to mower-conditioners and more particularly to a timing system for the rollers of a mower-conditioner to prevent interference of lugs from one roller to another.

2. Description of the Related Art

The rollers of mower-conditioners allow hay or other forage to pass between an upper and a lower roller to be crimped just before it is formed into a windrow so that it will dry more quickly. These rollers typically have intermeshing lugs thereon, for example as shown in U.S. Pat. No. 5,056,302 to Rosenbahn et al. It is important that the lugs of the upper roller fit in the depressions of the lower roller and vice versa when these rollers are close together so that the lugs of one roller do not interfere with the lugs of an adjacent roller. To solve this problem, timing gears have been devised as in the aforementioned patent to Rosenbalm et al. It has been determined however that if a large item passes between the rollers, on the gear end, the gear end of the rollers separate to allow the item to pass, and the opposite end stays together. As the separation of the rollers begins, the gear located on the upper roller proceeds to pass over the adjacent gear, this causes the upper roller to rotate with respect to the lower roller i.e. the upper roller timing gear "Walks" with respect to another. This ruins the timing and makes the intermeshing lugs on the roller's far side collide, possibly damaging the rollers, the gears, etc.

Accordingly, there is a need to solve the aforementioned problem in the prior art.

BRIEF SUMMARY OF THE INVENTION

The present invention provides timing of two mower-conditioner lugged rollers. These intermeshing rollers rotate and crimp hay after it is cut. The timing of the rollers is achieved by a four-gear timing system which allows the rollers to separate for a substantial distance while still maintaining the timing, thereby allowing a large particle or item, such as a stone, to pass therethrough and still maintain proper timing of the rollers to prevent collision of the lugs of one roller with the lugs of an adjacent roller. This invention, however, is broad enough to cover interference of any two rollers with lugs and is not just limited to conditioner rollers for mower conditioners.

The apparatus includes a first conditioner roller having lugs thereon, the first conditioner roller being rotatably attached about a first substantially horizontal axis to the frame. A second roller, having lugs thereon, is rotatably disposed above the first conditioner roller. A first timing gear having teeth thereon is operably attached to the first conditioner roller and is rotatable with the first conditioner roller. A second timing gear has teeth meshing with the teeth of the first timing gear. The second timing gear is rotatable about a second horizontal axis and the second timing gear is also mounted to a first member pivotally disposed above the first substantially horizontal axis whereby the second substantial horizontal axis is movable with respect to the first substantially horizontal axis.

A third timing gear having teeth thereon meshes with the second timing gear and is rotatable about a third substantial horizontal axis. A second member is pivotally attached about a fourth substantially horizontal axis. The third timing gear is rotatably and operably attached to the second member. A third member is pivotally attached to the first member and to the second member at both of the second and third substantially horizontal axes.

A fourth tiling gear, having teeth thereon, meshes with the teeth of the third timing gear. A fourth timing gear is rotatably attached to the second member about a fifth substantially horizontal axis and is rotatable with the second conditioner roller. The second conditioner roller is also operably and rotatably attached about the fifth substantially horizontal axis whereby as the first and second conditioner rollers move toward or away from each other when something is disposed between the first and second conditioner rollers, the first, second, third and fourth timing gears maintain relative clearance of the lugs of the first conditioner roller with respect to the lugs of the second conditioner roller.

An object of the present invention is to provide an improved timing gear system so as to prevent interference of lugs on adjacent rollers.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 4 is a rear view of the present invention taken along line 4—4 of FIG. 1 and showing the rollers with a normal amount of hay or other crop passing between the rollers and with the timing gears corresponding to that position shown in FIG. 3;

DETAILED DESCRIPTION OF THE INVENTION

Figure 1:
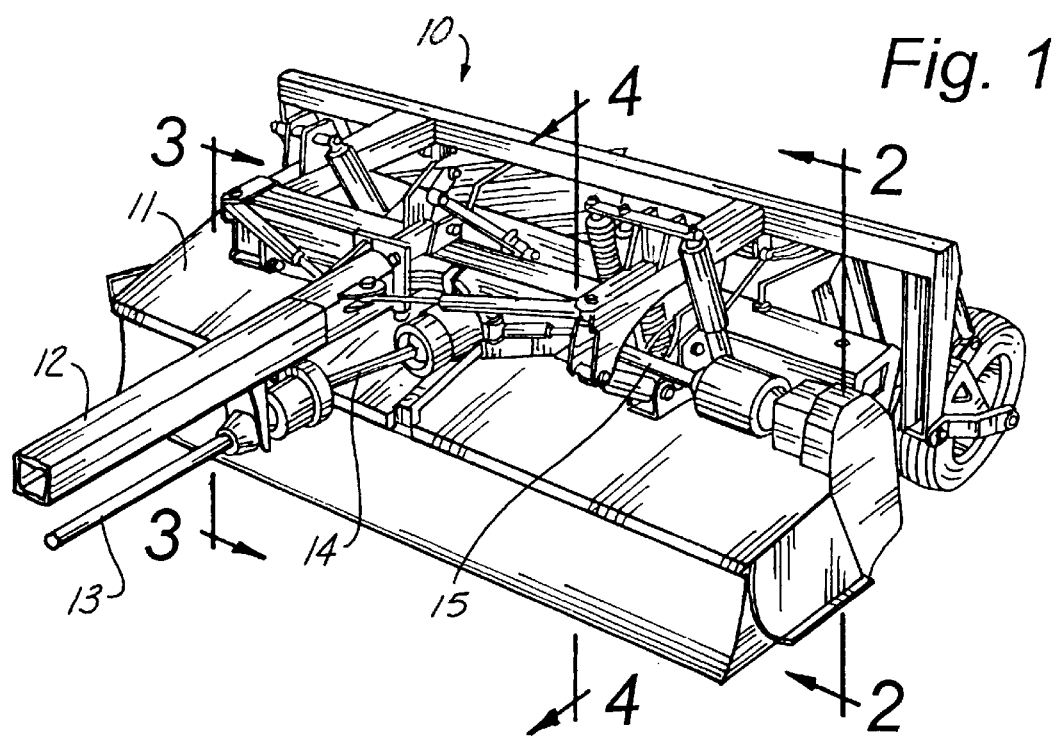
FIG. 1 is a perspective view of a mower-conditioner having the present invention thereon.

Referring now to the drawings, wherein like reference numerals designate identical or corresponding parts throughout the several views, FIG. 1 shows a mower-conditioner (10) constructed in accordance with the present invention and having a sheet metal body (11) which acts as a frame for the mower-conditioner (10). A tongue (12) attaches with a hitch (not shown) to a tractor (not shown) and driven shafts (13), (14) and (15) are rotated by the power-takeoff on the tractor to turn a pulley (not shown) attached to shaft through a belt and pulley (16) in FIGS. 4 and 5.

Figure 2:
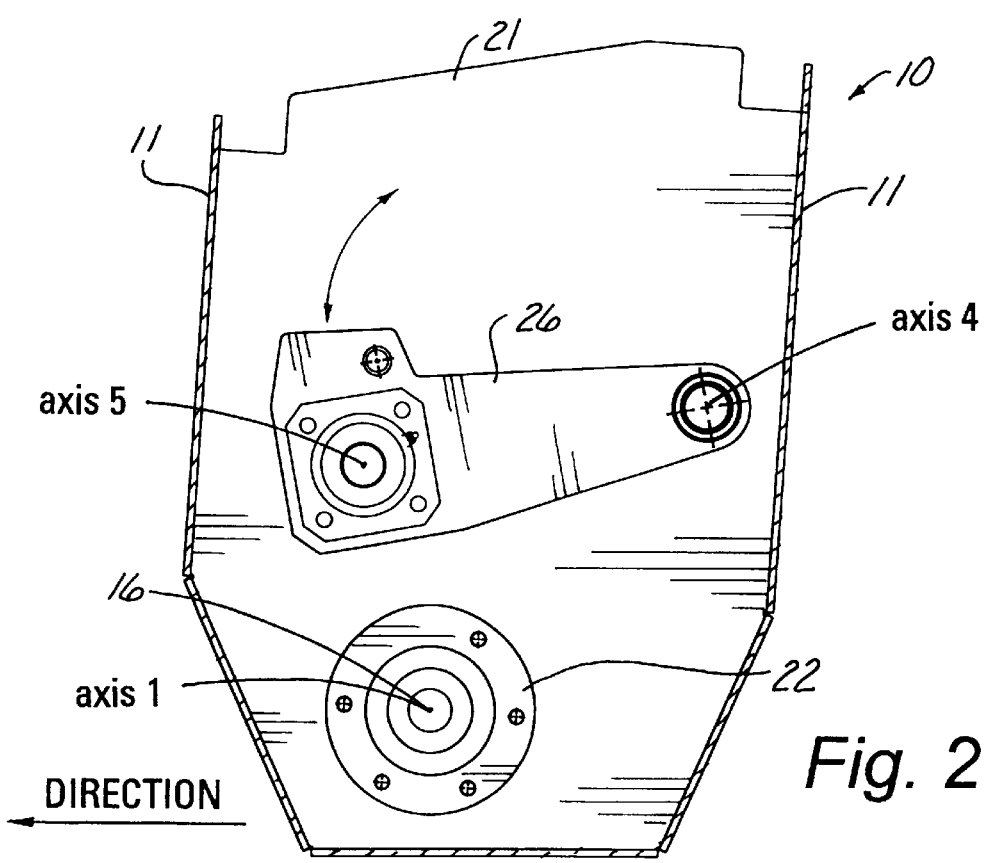
FIG. 2 is an enlarged cross sectional view taken along line 2—2 of FIG. 1.
Figure 3:
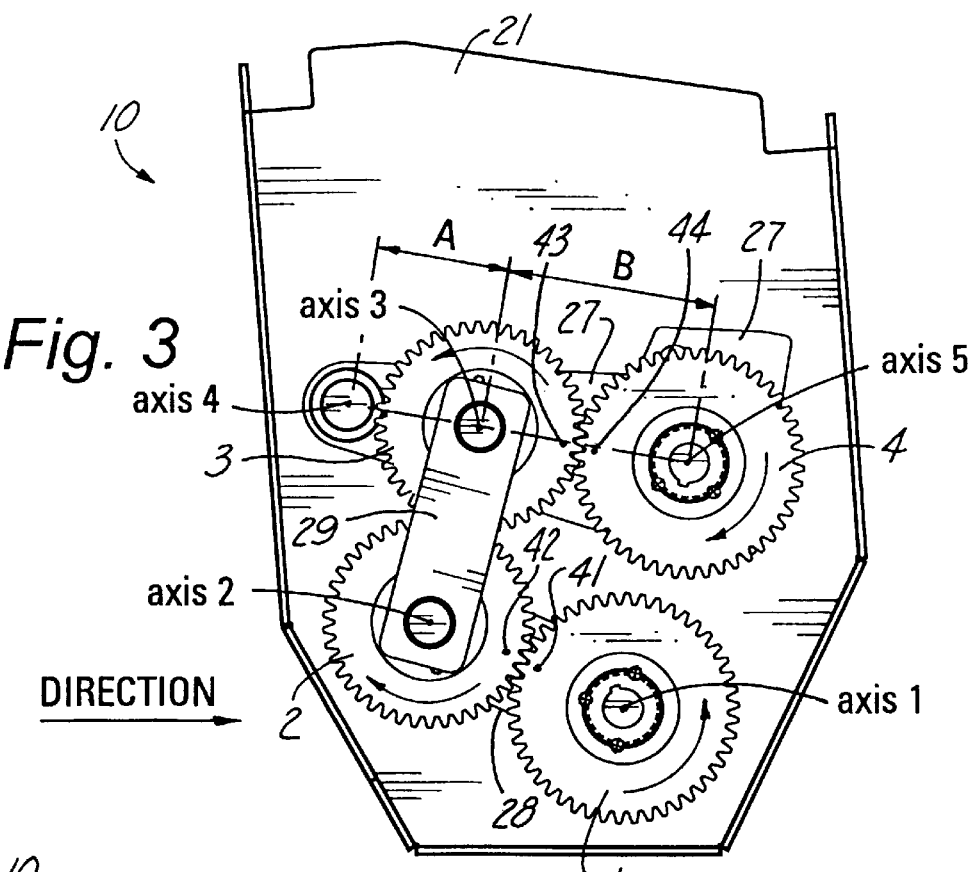
FIG. 3 is a cross sectional view taken along line 3—3 of FIG. 1 when the rollers of the mower-conditioner are in their normal operating position with a small amount of hay or other crop passing therethrough and showing the timing gear arrangement of the present invention.
Figure 3A:
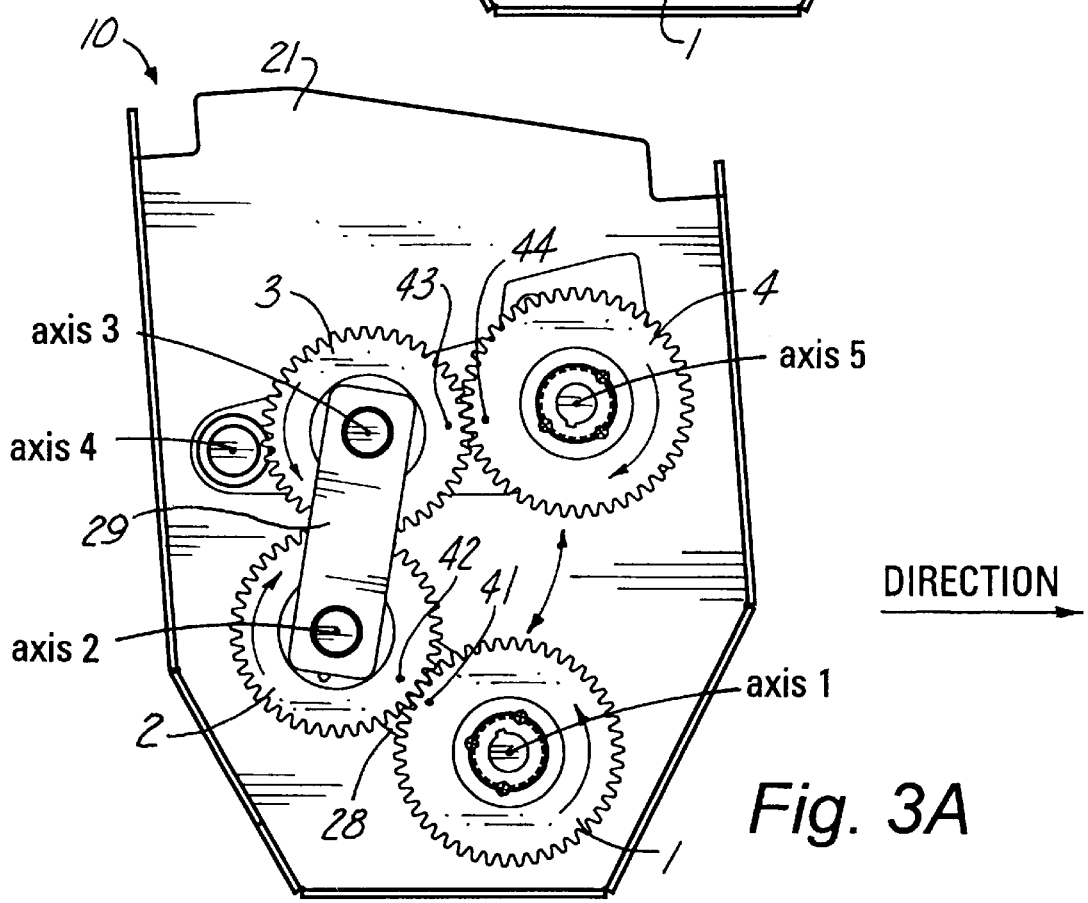
FIG. 3A is a view like FIG. 3, but showing the position of the timing gears when a large object passes between the end of the rollers adjacent the timing gears as shown in FIG. 4A.
Figure 4A:
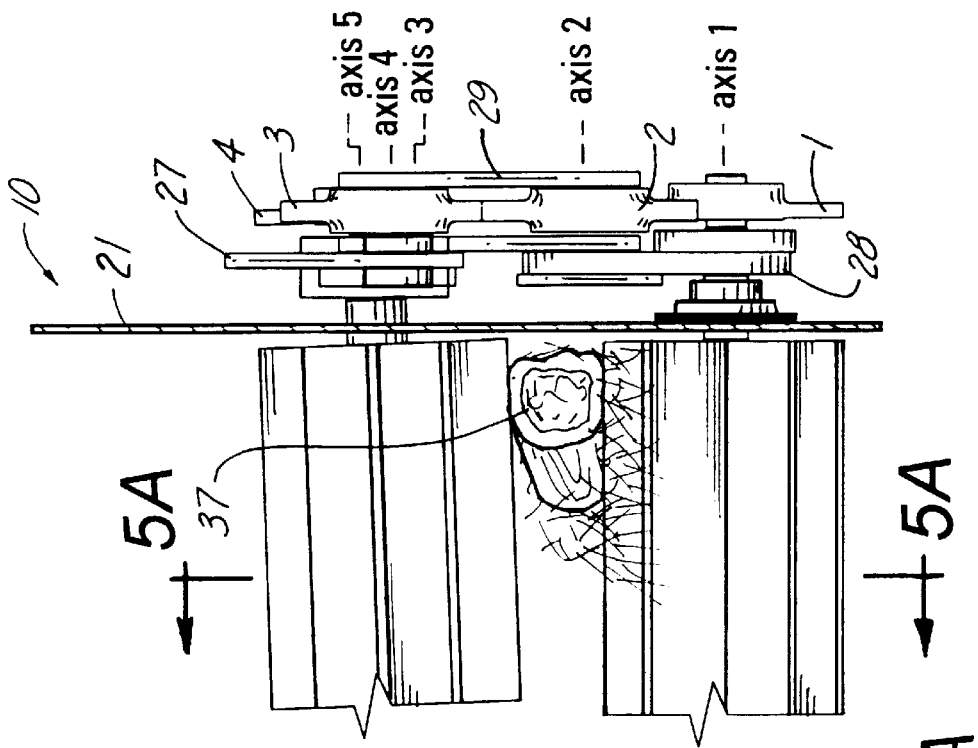
FIG. 4A is also a view along line 4—4 of FIG. 1 similar to FIG. 4, but showing a large object passing through the timing gear end of the rollers.
Figure 4A:
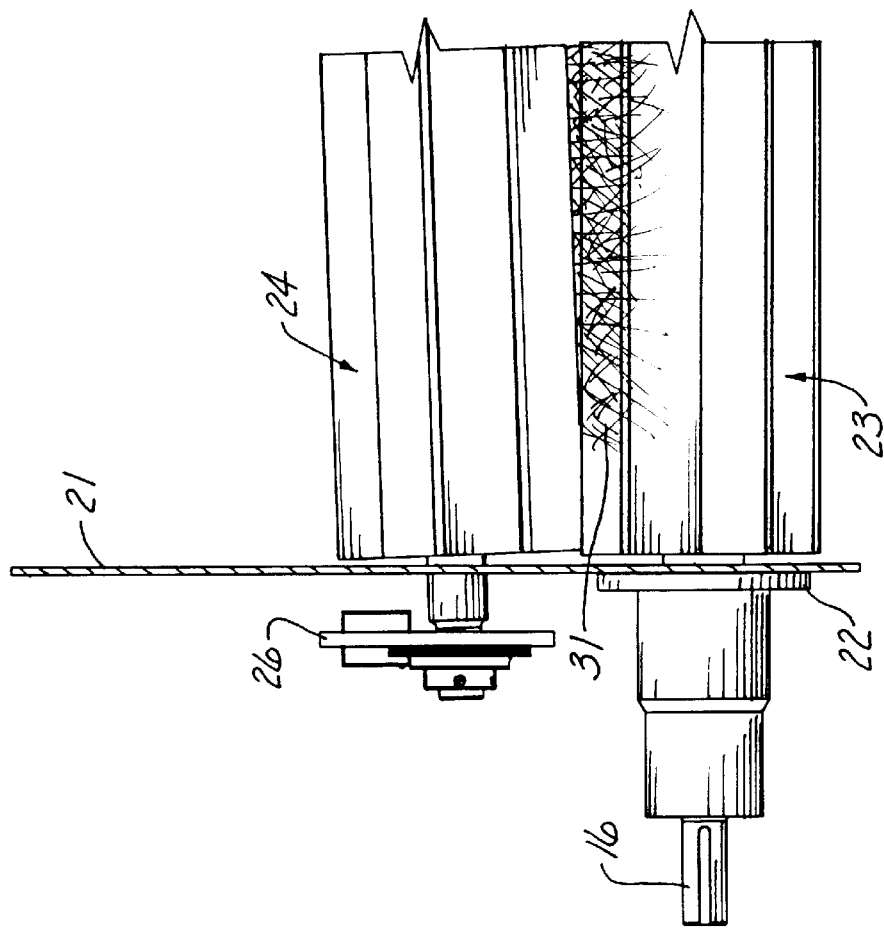
Figure 5:
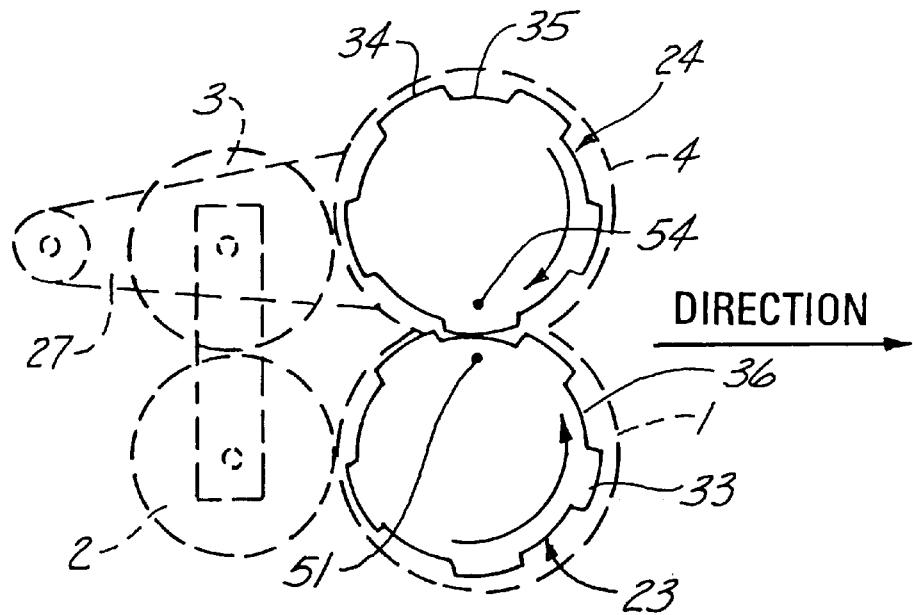
FIG. 5 is a cross sectional view taken along line 5—5 of FIG. 4 and showing the intermeshing lugs and depressions of the top and bottom rollers in the normal operating position such as shown in FIGS. 3 and 4, the superimposed dashed lines showing the corresponding position of timing gears when the rollers are in the FIG. 5 position.
Figure 5A:
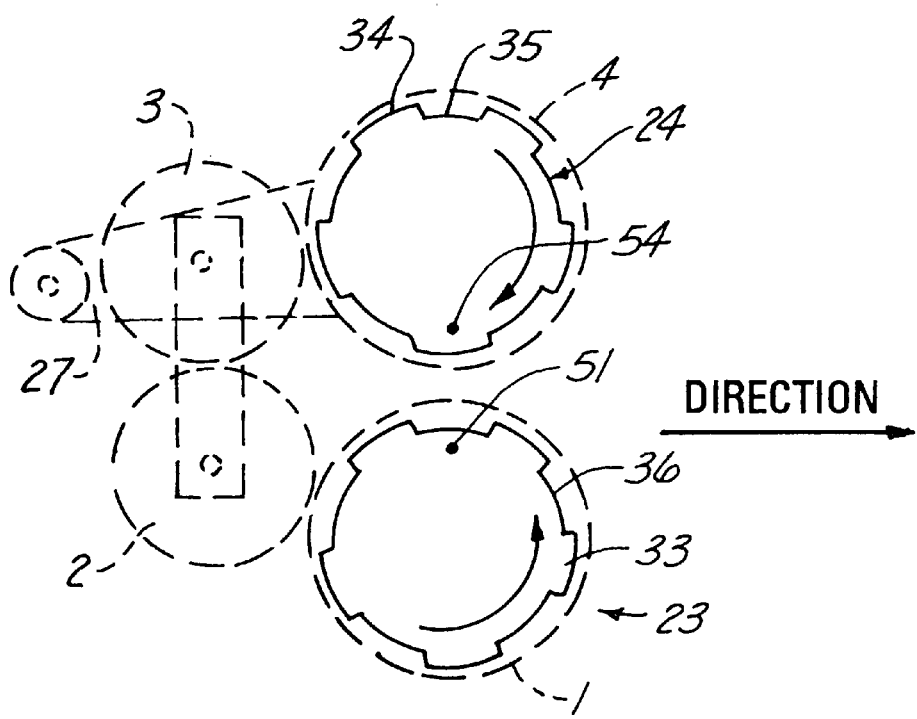
FIG. 5A is a view like FIG. 5, but showing the top and bottom rollers in the position corresponding to FIG. 4A, the superimposed dashed lines showing the corresponding position of the timing gears when the rollers are in the FIG. 5A position.

Referring to FIG. 2, which is a side view of the conditioner rollers section, the housing (11) is shown with side panels (21) rigidly attached thereto. A bearing (22) is attached to a side panel (21) and permits the shaft (16) to rotate therein. The shaft (16) is attached to lower conditioner roller (23) shown in FIGS. 4 and 4A. A top roller (24) works in conjunction with the bottom roller (23) to crimp and condition hay or another crop before it is windrowed by the mower-conditioner (10). The bottom roller (23) rotates on a fixed axis 1 as shown in FIGS. 2, 4 and 4A while the top roller (24) rotates about an axis 5 which moves up and down because the roller is attached to a roller arm (26) on the side shown in FIG. 2 and about the roller arm or second member (27) as shown in FIGS. 3 and 3A, for example. This top roller (24) moves up and down as it pivots about axis 4 of the roller arms (26) and (27).

As stated above, the lower roller is rotated by the power-takeoff of the tractor through driven shafts (13), (14), (15) and through a pulley and belt arrangement (not shown) down to the shaft (16). The top roller (24) however is driven through the timing gear arrangement shown in FIGS. 3, 3A, 4 and 4A.

Referring to FIG. 3, it will be noted that this is the normal operating position of the rollers and corresponds to the FIG. 4 position of the rollers and timing gears. The timing gear (1) is fixed with respect to the lower roller (23) and rotates therewith. As the timing gear (1) rotates in the direction shown in FIG. 3, this rotation will be transferred to the gear (2) which rotates about an axis 2. This gear (2) is pivotally attached to a first member or link (28) which pivots around the axis 1 and can pivot around the axis 2 as well. Another link (29) is pivotally attached at one end around axis 2 and at the other end around an axis 3. Axis 3 also has a gear (3) rotatably attached thereto and the third member or link (29) and gear (3) are pivotally and rotatably attached, respectively to the roller arm (27) as shown in FIGS. 3 and 3A. The roller arm is pivotal about the axis 4 just like the roller arm (26) pivots about axis 4.

A gear (4) is rotatably attached to the roller arm (27) about an axis 5 which allows the gear (4) and axis 5 to move up and down around axis 4. The gears (1), (2), (3), and (4) are meshed together as can be readily seen in FIGS. 3 and 3A whereas movement from gear (1) rotates the gear (2) in the direction shown in movement of the gear (2) and rotates the gear (3) in the direction shown and likewise the rotation of gear (3) rotates the gear (4) in the direction shown.

The top roller (24) is fixed with respect to the gear (4) and rotates therewith in the direction shown by the gear in FIGS. 3 and 3A. The purpose of the intermeshing gear arrangements of FIGS. 3 and 3A is to control the timing of the rotation of the top roller (24) with respect to the lower roller (23). As the mower-conditioner (10) is used and travels in the forward direction as indicated in FIGS. 2, 3 and 3A, the crop (31) will enter between the rollers (23) and (24) and will be crimped so as to cause it to dry more quickly than if not so conditioned. Because of the timing gears (1), (2), (3) and (4), the lugs (33) on the lower roller (23) will be timed so that they do not hit the lugs (34) of the upper roller (24), but instead fit into the depressions (35) of upper roller (24). Likewise, the timing of the top roller (24) will be such with respect to the lower roller (23) that the lugs (34) do not hit the lugs (33) on the lower roller (23), but instead always fit into the depressions (36) on the lower roller (23).

The problem with the prior art is overcome by the present arrangement because even if a large object such as a branch (37) passes through between the top and bottom rollers (24) and (23) respectively, as shown in FIG. 4, the timing gear arrangement will compensate to still maintain the timing as shown by the timing marks (41), (42), (43) and (44) on respective gears (1), (2), (3) and (4) in FIGS. 3 and 3A, which show how the timing is maintained by the present arrangement even when the gears move. This is especially a problem in the prior art when the object such as object (37) is on the timing gear side of the mower-conditioner. By having the roller arm (27) pivot about axis (4) behind the center of gear (3) as shown in FIGS. 3 and 3A, this problem is solved. As the gear (4) rotates upwardly, gears (2) and (3) move upwardly as well. There exists a dimension A (see FIG. 3) between axis 4 and axis 3 which operates as a function of dimension B (FIG. 3) which is the distance between axis 3 and axis 5 so that as gear (4) moves upwardly, the movement of gears (2) and (3) will cancel any substantial rotation of gear (4) with respect to gear (1). Therefore, the timing between the lugs (33) of roller (23) and lugs (34) of roller (24) will be maintained throughout any roller separation distance. This eliminates the drawbacks of the prior art.

Accordingly it will be appreciated that the preferred embodiment shown herein does indeed accomplish the aforementioned object. Obviously many modifications and variations of the present invention are possible in light of the above teachings. It is therefore to be understood that, within the scope of the appended claims, the invention may be practiced otherwise than as specifically described.

We claim:
1. Apparatus comprising:
  a frame;
  a first roller having lugs thereon, said first roller being operably rotatably attached about a first substantially horizontal axis to said frame;
  a second roller having lugs thereon;
  a first timing gear having teeth thereon being operably attached to said first roller and rotatable with said first roller;
  a second timing gear having teeth thereon, the teeth of said second timing gear meshing with the teeth of said first timing gear, said second timing gear being rotatable about a second horizontal axis, said second timing gear also being mounted to a first member pivotally disposed about said first substantially horizontal axis whereby said second substantial horizontal axis is movable with respect to said first substantially horizontal axis;
  a third timing gear having teeth thereon, the teeth of said third timing gear meshing with the teeth of said second timing gear, said third timing gear being rotatable about a third substantial horizontal axis;

a second member pivotally attached about a fourth substantially horizontal axis, said third timing gear being rotatably operably attached to said second member;

a third member pivotally attaching said first member to said second member at both of said second and third substantially horizontal axes; and a fourth timing gear having teeth thereon, the teeth of said fourth timing gear meshing with the teeth of said third timing gear, said fourth timing gear being operably rotatably attached to said second member about a fifth substantially horizontal axis and rotatable with said second roller, said second roller also being operably rotatably attached about said fifth substantially horizontal axis whereby as the first and second rollers move toward or away from each other due to something being disposed between the first and second rollers, the first, second, third and fourth timing gears maintain a relative clearance of the lugs of the first roller with respect to the lugs of the second roller, whereby the distance between the third and fourth axes operates as a function of the distance between the third and fifth axes so that as the first and second rollers separate, the movement of the second and third timing gears will cancel any substantial rotation of the fourth timing gear with respect to the first timing gear.

2. The apparatus of claim 1 wherein said rollers are conditioner rollers for conditioning hay.

3. The apparatus of claim 2 wherein a plant cutting assembly is operably attached to said frame in front of said rollers for mowing a crop to be harvested.

* * * * *